Dec. 28, 1965   J. L. JEANNERET   3,225,630
CUTTING CONTROL MEANS FOR LATHES
Filed May 27, 1964                                2 Sheets-Sheet 1

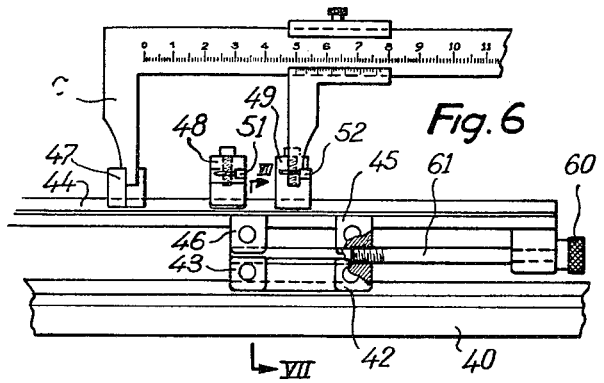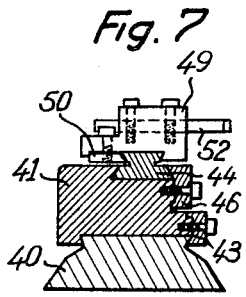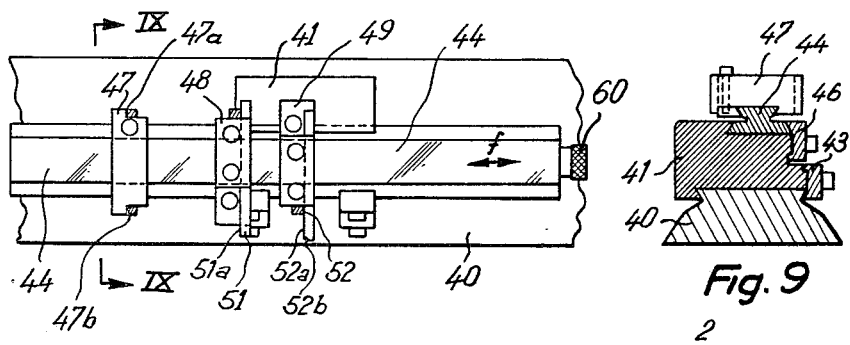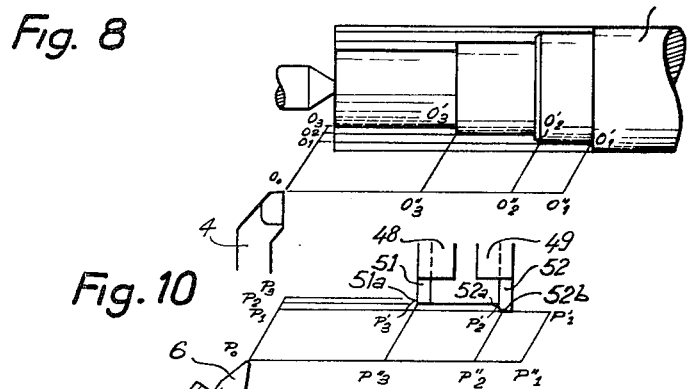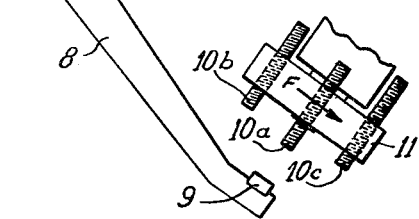

United States Patent Office 3,225,630
Patented Dec. 28, 1965

3,225,630
CUTTING CONTROL MEANS FOR LATHES
Jules Louis Jeanneret, 13 a 21 Rue H. Gelin,
Niort, Deux-Sevres, France
Filed May 27, 1964, Ser. No. 370,546
10 Claims. (Cl. 82—14)

The invention relates to lathes, and more especially copying lathes of the type wherein a feeler sensing the contour of a pattern-piece or template acts through hydraulic or other suitable means to control the radial position of the cutting tool of the lathe during traversing thereof relative to the work, whereby to cause the tool to cut a contour in the work corresponding to the contour sensed by the feeler.

Objects of the invention include the provision of a cutting control device especially useful as an auxiliary control attachment for a copying lathe, which will enhance its usefulness and practicalness in many instances of use, the provision of means associated with the feeler of a copying lathe and usable in the presence or absence of a pattern engaged by the feeler for predetermining the depth and/or length of a cut and of each of a prescribed plurality of cuts. Other objects will appear.

In accordance with an aspect of the invention there is provided in a copying lathe of the specified type, a plurality of first adjustable stop means selectively, indexable to each of a plurality of settings in each of which a selected one of said first stop means is engageable by the feeler of the copying lathe to limit the feeler displacement in a radial direction and thereby determine the depth of cut performed by the lathe tool in the work; and second adjustable stop means engageable by said feeler to limit the feeler displacement in an axial direction and thereby determine the length of the cut performed by said tool in the work; engagement of the feeler with said second stop means being operative to return both the tool and feeler to prescribed initial positions and to index said plurality of first stop means to a next one of its said plurality of settings.

The plurality of first stop means, which serve to determine the depth of cut are preferably provided in the form of stop screws threaded in angularly spaced positions in a rotatively indexable barrel or disc so that angular indexing of the barrel to each of a series of settings will insert a related one of said stop screws into position for engagement by the feeler.

The second stop means, serving to determine the axial length of a cut, are preferably provided in the form of a plurality of sliders separately adjustable lengthwise along a slide bar extending longitudinally of the lathe frame.

An exemplary embodiment of the invention will now be described for purposes of illustration but not of limitation with reference to the accompanying diagrammatic drawings wherein.

Figure 5:
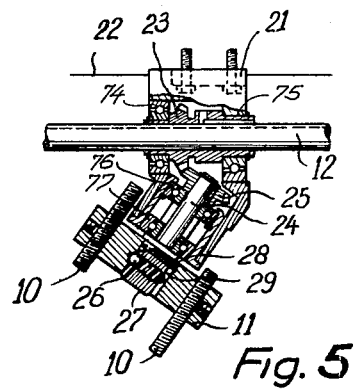
Figure 4:
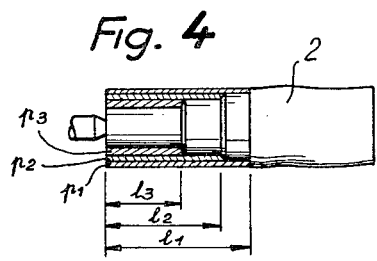

FIGURE 4 separately shows a typical workpiece and indicates the depths and lengths of successive cuts made therein;

FIGURE 5 is a fragmentary sectional view on an enlarged scale illustrating preferred means for mounting a revolving barrel type support for the stop screws constituting the first, depth-adjusting stop means of the invention;

FIGURE 6 is a fragmentary view in side elevation of part of a copying lathe provided with the improved attachment and more particularly showing the second or axial afore-mentioned stop means for predetermining the cutting length;

FIGURE 7 is a section on line VII—VII of FIGURE 6;

FIGURE 8 is a corresponding view in plan;

FIGURE 9 is a section on line IX—IX of FIGURE 8, and

FIGURE 10 is a fragmentary and schematic showing of the tool and feeler together with the first and second stop means of the invention as illustrated in the foregoing figures and also illustrating the respective paths of travel of the tool and feeler during the successive cuts performed under control of said stop means.

Figure 1:
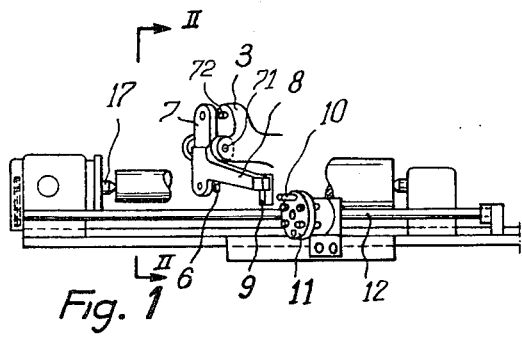
FIGURE 1 is a partial view in side elevation showing part of a copying lathe provided with means according to the invention and more particularly showing the first or radial afore-mentioned stop means associated with the feeler for predetermining the cutting depth.
Figure 2:
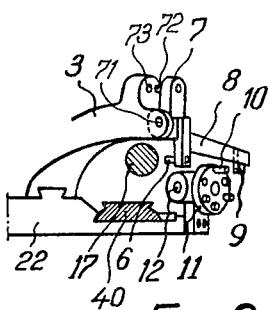
FIGURE 2 is a section on line II—II of FIGURE 1.
Figure 3:
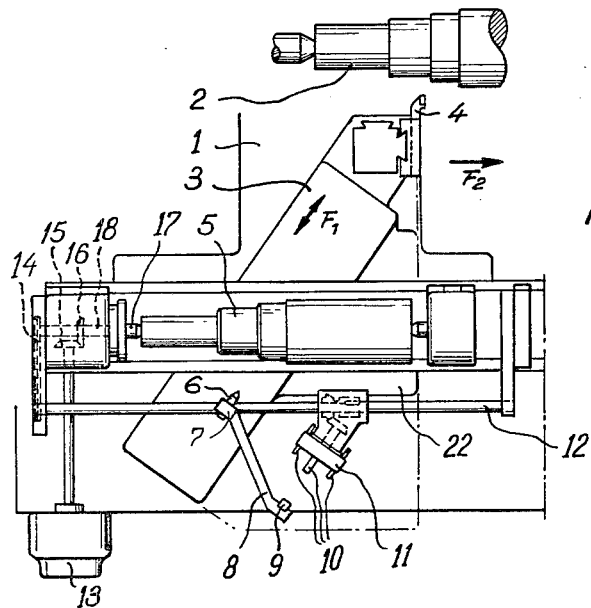
FIGURE 3 is a corresponding view in plan.

First referring to FIGURES 1-3, there is partly illustrated a lathe including a conventional slide or carriage 1 traversable through conventional means not shown, in a direction parallel to the axis of revolution of a workpiece 2 suitably mounted between centres on the lathe. The arrow F2 in FIGURE 3 indicates the cutting direction of the tool 4 relative to the work 2 during the said traversing movement of the carriage 1.

A copying slide 3 carrying the tool 4 is supported on the carriage 1 for displacement with respect thereto, along ways not shown, in oblique directions towards and away from the work as indicated by the dual arrow F1. A feeler finger 6 is carried at the lower end of a lever 7 which, as best shown in FIGURES 1 and 2, is pivoted at an intermediate point about horizontal pivots 71 between bearing arms projecting from the slide 3. The feeler 6 is adapted to engage the periphery of a pattern piece 5 mounted on the machine frame between centres 17. As here shown, the pattern piece 5 is mounted by way of a support which is indexable in rotation during the cutting operations, the indexing rotations being imparted from an electric motor 13 which through bevel gearing 15–16 rotates a shaft 18 carrying the centre 17. However this is not essential.

The feeler lever 7 is provided at its upper end with an actuator finger 72 which cooperates with the actuator 73 of a hydraulic valve or the like, not shown, carried by slide 3 and connected in a hydraulic circuit with an hydraulic motor, not shown, to impart displacements to the tool carrier slide in oblique radial direction parallel to F1 whereby such tool displacements will follow the radial displacements of the feeler finger 6 as commanded by the contour of the pattern piece 5, and thereby cause the tool 4 to cut a corresponding contour in the work 2, in the well-known manner.

In accordance with the invention, means are associated with the feeler 6 for commanding feeler displacements both in a radial and an axial direction independently of any contact of the feeler finger 6 with a pattern contour such as that of pattern piece 5, as for example in order to perform a preliminary rough cutting of the work as will be more clearly understood presently.

For controlling feeler displacements in a radial direction there is provided an indexable revolving barrel 11 which is supported from the frame of the lathe in a manner presently described in detail so as to be rotatable about a horizontal axis, extending parallel to the oblique radial direction F1. The barrel or disc 11 is provided with a number of stop screws 10 adjustaby threaded in a cirumferential array in it. The feeler lever 7 is provided according to the invention with a lateral extension arm 8 fitted with an auxiliary feeler finger 9 at its end, which is adapted during pivotal movement of lever 7 about its pivots 71 to engage a particular one of the stop screws 10 positioned in an operative position as determined by the indexed setting of the barrel 11. It will be understood that such engagement will limit the pivotal movement of feeler lever 7 and hence the cutting depth of the lathe tool 4 by an amount determined by the particular adjustment of the stop screw 10 at the setting under consideration.

The rotatable mounting means for radial stop carrier barrel 11 will now be described with reference to FIGURE 5. An indexing shaft 12 is supported on the lathe frame and is driven in intermittent indexing rotation by motor 13 by way of a sprocket chain drive 14 and bevel gearing 15–16. A bracket 21 is secured e.g. belted, to a frame member 22 connected to carriage and supports a pair of spaced bearings 74, 75 through which shaft 12 slidably and rotatably extends. The bracket 21 is provided with an extension arm at an angle thereto in which are supported another pair of spaced bearings 75, 76, supporting a stub shaft 24. A bevel gear 25 on stub shaft 24 meshes with a bevel gear 23, slidable on shaft 12 between bearings 74, 75 to rotate stub shaft 24 from shaft 12. The barrel or disc 11 is secured on the projecting outer end of stub shaft 24, and in the example shown the attachment of barrel 11 on shaft 24 is detachable, including a retainer ball 26 slidable in a diametric passage formed in the outer end of shaft 24 and pressed outwardly by a spring 27 into engagement with a detent recess formed in the peripheral wall of a central bore in disc 11. A driving connection is provided between stub shaft 24 and disc 11 e.g. in the form of a mortise slot and tenon and/or a cotter pin 28.

The arrangement so far described operates as follows. Referring to FIGURE 4, it is assumed by way of example that it is desired to cut a workpiece 2 of the stepped cylindrical form shown, the cutting operations involving three passes or cuts with the cutting tool 4, having the respective radial depths $p1$, $p2$ and $p3$, and the respective axial lengths $l_1$, $l_2$ and $l_3$. It is further assumed that a finishing pass is to be performed only on the smallest-diameter end section of the workpiece, i.e. over the axial leingth $l_3$. It will be understood that throughout the three rough cutting passes at the depths $p1$, $p2$ and $p3$ the feeler finger 6 remains out of contact from a pattern piece such as 5 (although such pattern piece may well be mounted in position between the centres 17 as shown), and that the said depths are exclusively determined by the adjustment of the stop screws 10 of the invention as will be described. It is only in the finishing pass, if such pass is desired, that the feeler 6 engages the pattern piece.

Accordingly, three of the stop screws 10 are adjusted so that the projecting lengths correspond to the respective cutting depths $p1$, $p2$ and $p3$. A conventional programmed control system of the lathe, not shown, is started in operation so that at the beginning of the cutting sequence motor 13 operates through gearing 15–16, sprocketd rive 14, shaft 12, gearing 23–25 and shaft 24, to index the barrel 11 to an initial setting in which an initial one of the three adjusted stop screws 10, i.e. the one adjusted into correspondence with the initial cutting depth $p1$, is placed in an operative position for cooperation with auxiliary feeler finger 9. The control system then operates, e.g. through a conventional hydraulic drive not shown, to displace the copying slide 3 in the oblique radial direction of arrow F1 towards the work 2. This movement of slide 3 proceeds until auxiliary feeler finger 9 engages the stop screw 10 in operative position, whereupon the feeler lever 7 is rotated a small amount about its pivots 61 and its actuator finger 72 acts on the valve actuator 73 to operate the hydraulic drive to arrest the inward movement of copying slide 3. The axial traverse displacement of the lathe slide 1 is now automatically commenced, and the tool 4 cuts into the work 2 so as to remove therefrom an annular section of material of the depth $p1$, as controlled through continued cooperation of finger 9 with stop screw 10 and finger 72 with valve actuator 73. The axial traverse of carriage 1 continues until it is automatically arrested, on completion of the prescribed length of pass $l_1$, preferably through the axial stop arrangement to be later described with reference to FIGURES 6–10. When this occurs the programmed control system operates to return the carriage 1 and copying slide 3 to their initial positions and, through motor 13, to step the barrel 11 to its next indexed setting in which the stop screw 10 in operative position is the screw preadjusted to correspond with the second depth of cut $p2$.

A similar manner of operation now takes place to cause the tool 4 to cut the work 2 to the depth $p2$ over the axial length $l_2$, and then once again to perform a third pass in which the tool cuts the work to the depth $p3$ over the length $l_3$.

When the three passes have been completed, a finishing pass may if desired be effected over the length $l_3$ of the work, as mentioned previously, for this purpose the control system is programmed so that after completion of the third roughing pass described above the barrel 11 is indexed to a setting in which there is no stop screw 10 in operative position. Thus on advance of slide 3 towards the work 2, the slide movement continues until the feeler finger 6 engages the periphery of the pattern piece 5. Thus the final cutting pass is performed in the well-known manner usual to copying lathes i.e. with the hydraulic drive system now being under control of the co-operation between the feeler finger 6 and the contour of the pattern piece 5.

The means for predetermining the axial lengths of the cutting passes, such as the lengths $l_1$, $l_2$ and $l_3$ referred to above, will now be described with reference to FIGURES 6–10. In the illustrated example the axial adjusting attachment comprises a number of slideblocks 47, 48, 49 independently slidable by way of dovetail grooves along a longitudinally extending slide rule member 44 and blockable at precisely predeterminable positions thereon by way of screws and clamping shims 50. The slide-rule member 44 in turn has a slidable dovetail connection with a supporting block 41, and is adjustable with respect to it by way of a bed-screw 61 and knob 60, and blockable at a predeterminable longitudinal position by means of clamps 45, 46. The supporting block 41 itself, in this example, is similarly slidable longitudinally by way of another dovetail connection with a longitudinal base member 40 and is blockable at an adjusted position thereon by means of screwed-on clamps 42, 43. The base member 40, as shown in FIGURE 2, is mounted upon the frame member 22 supporting the copying slide 3 as earlier described.

The slideblocks 48 and 49 are shown as having separate stop members or shims 51 and 52 secured thereto as with screws. The stops 51 and 52 have active faces 51a and 52a respectively, on their sides directed towards slideblock 47. In addition, the stop 52 is here shown as provided at its end with a chamfer 52b corresponding to the chamfer provided at the shoulder O'2 (FIGURE 10) of the work 2 to be machined. It will be understood that the slideblocks 51 and 52 are adjusted in position along the member 44 with respect to the position of slideblock 47 on said member, so that the active face 51a of stop 51 is spaced from an active face 47b of block 47 a distance corresponding to the length of the end section of the workpiece 2 from its left hand end to the shoulder indicated at O'3 (FIGURE 10), and so that the active face 52a of stop 52 is spaced from the face 47b a distance corresponding to the length from said left hand end to the next shoulder indicated at O'2. If desired, an additional slideblock (not shown) provided with a stop member or shim, similar to each of the slideblocks 48, 49 with their shims 51, 52, may be provided adjustable along member 44 for determining the position of the rightmost shoulder O'1. However, it is here assumed for simplicity that the position of this shoulder O'1 is determined during the cutting operation through conventional means, manually or otherwise.

The positional adjustments just referred to may conveniently be made as follows. First, with block 47 positioned at a convenient, arbitrarily selected position along member 44, knob 60 is rotated to slide the member 44 in the direction shown by arrows f until the active face 47b of block 47 has been brought to a selected position for locating a desired initial position Po of the feeler finger 6 (FIGURE 10) and a corresponding initial position Oo for the tip of tool 4. The three radial stop screws 10a, 10b and 10c are adjusted as earlier described and as required to predetermine the respective depths of the three cutting passes as at O1, O2, O3 (FIGURE 10). For adjusting the position of slideblock 49 along member 44, the auxiliary feeler finger 9 is first brought into contact engagement with the corresponding radial stop screw, which is screw 10b. A caliper square C (FIGURE 6) is adjusted to measure the desired length of pass O2–O'2, and one of its crossheads is placed in engagement with the active face 47a or 47b of block 47. The slideblock 49 is then slid along member 44 to engage its active face 52a with the other crosshead of the caliper square. Slideblock 49 has thus been adjusted. A similar procedure is used to adjust the other slideblock 48, with auxiliary feeler finger 9 this time engaging the related screw 10b and with the caliper square adjusted to the length of pass O3–O'3.

With the radial and axial adjusting stops thus preset, cutting operations may be commenced. At the start of the cutting cycle the feeler finger 6 is at the initial position Po and the tool 4 at initial position Oo. The automatic control system operates to move the copying slide 3 in direction of arrow F1 towards the work until finger 9 encounters stop screw 10a, whereby the feeler finger 6 describes the path Po–P1 causing the tool 4 to travel from Oo to O1. Carriage 1 is then displaced axially (arrow F2) and is arrested through any suitable means not shown (such as the provision of an additional slideblock similar to 49) when the feeler has moved from P1 to P'1, and the tool from O1 to O'1. The first cutting pass has thus been completed. Slide 3 is now moved back by the machine control system until the tool 4 has been moved to position O"1 and the feeler 6 to position P"1, and then the carriage 1 is moved back to return the tool to initial position Oo and the feeler to initial position Po. Barrel 11 is automatically indexed to present screw 10b to its active position for engagement by auxiliary feeler 9.

The second cutting pass is now commenced, with the slider 3 and carriage 1 being again operated by the automatic control system in a manner similar to that above described, so that feeler 6 moves from Po to P2 (as determined by engagement of auxiliary feeler 9 with screw 10b), then axially from P2 to P'2 as determined by engagement of feeler 6 with the active face 52a of stop 52 and chamfer 52b, then radially back to position P"2 and finally axially back to initial position Po. During this time the tool 4 has described a similar closed path from O1 through O2 to O'2, cutting the second pass in the work including the chamfer therein, and then back through O"2 to initial position Oo. Barrel 11 is indexed to present screw 10c to active position.

The third pass is performed in a similar manner, with feeler 6 describing the path Po–P3–P'3–P"3–Po, and the tool 4 describing the corresponding path Oo–O3–O'3–O"3–Oo. In this third pass the depth of cut (point O3) is determined by engagement of auxiliary feeler finger 9 with screw 10c and the axial length of the cut (point O'3) is determined by engagement of feeler finger 6 with active face 51a of axial stop 51.

Finally, as earlier described, a finishing pass may be performed over the small-diameter end section of the work, for which purpose barrel 11 would be automatically indexed to a setting in which none of the stop screws 10 is in active position i.e. in the path of auxiliary feeler 9, so that the feeler 6 is able to engage the contour of a template or pattern piece such as 5 (FIGURE 3) to determine the depth of the finishing pass.

The auxiliary cutting control means of the invention is conveniently provided as an attachment adaptable to a conventional copying lathe or it may be incorporated in a lathe on construction. An automatically controlled lathe fitted with such auxiliary control means can be operated in a variety of modes, including the following:

The radial or cutting depth control means including the indexable barrel 11 may be used per se in the absence of the axial or cutting length control means of the invention, the axial length of the cutting strokes being determined by any suitable conventional means. A pattern contour may be used, especially for a finishing pass as described herein, and the depth control means may be associated with the indexable pattern-carrier system using a plurality of cyclically operative templates and/or pattern pieces as described in the Applicant's French Patent 1.290.951 corresponding to United States patent application Serial No. 99,282, filed Mar. 29, 1961.

Both the radial, cutting depth control means and the axial, cutting length control means of the invention may be used concurrently as herein described, Here again a pattern contour may be used as for a finishing pass, and the system may be associated with the indexable pattern-carrier of the said French patent.

Finally provision of the auxiliary cutting control means of the invention will of course not impair the conventional operation of the automatic copying lathe on which said control means is mounted when such operation is desired.

It will be evident that various modifications may be made in the exemplary embodiment of the invention shown and described without departing from the scope of the invention. Thus, while it is preferred that the paths described by the feeler finger 6 and auxiliary feeler finger 9 extend in an oblique direction such as F1 at an angle to the normal to the axis of rotation of the work as here shown, and the depth adjusting stop screws 10 are hence also movable on paths lying at corresponding angles in some cases, all such paths may be made normal to the axis of the work, e.g. in the absence of the axial adjusting means. It is to be understood that in the claims, where the context permits, the word "radial" should be construed as meaning "having a radial component." Further, both the words "radial" and "axial" are to be understood with reference to the axis of work rotation.

What I claim is:

1. A copying lathe having a revolving work support and a tool support movable relative thereto in axial and radial directions, feeler means connected for axial movement with the tool support and radially displaceable relative thereto, means responsive to radial displacement of the feeler means relative to the tool support for imparting corresponding radial movement to the tool support relative to the work, first stop means adjustable in a radial direction and interposable in the path of radial feeler displacement for limiting said radial displacement thereof and determining the depth of cut of the tool into the work, and second stop means adjustable in an axial direction and interposable in the path of axial feeler movement for limiting said axial movement thereof and determining the length of said cut.

2. A lathe according to claim 1, wherein said first stop means comprises a plurality of independently adjustable stops, an indexable support for said stops, and means operative preparatory to a cutting pass of said tool support relative to the work for indexing said support to a position in which a prescribed one of said stops is interposed in the path of radial displacement of the feeler means.

3. A lathe according to claim 1, wherein said second stop means comprises a plurality of independently adjustable stops, and means supporting said stops on frame structure of the lathe for independent sliding adjustment axially thereof.

4. A lathe according to claim 3, wherein at least one of said stops is contoured to cause the tool to cut a corresponding contour in the work.

5. A copying lathe having a revolving work support and a tool support movable relative thereto in an axial direction and an oblique radial direction, feeler means connected for axial movement with the tool support and oblique radial displacement relative thereto, means responsive to radial displacement of the feeler means relative to the tool support for imparting corresponding radial movement to the tool support relative to the work, and stop means adjustable in an axial direction and interposable in the path of axial feeler movement for imparting oblique radial displacement to the feeler means on engagement of the feeler means with the stop means to thereby limit said axial movement of the feeler means and determine the length of cut of the tool relative to the work.

6. The lathe defined in claim 5, including other stop means mounted for axial movement with said tool support and for adjusting displacement in said oblique radial direction and interposable in the oblique radial path of said feeler means for imparting oblique radial displacement to the feeler means on engagement of the feeler means with said other stop means to thereby limit said oblique radial displacement of the feeler means and determine the depth of cut of the tool into the work.

7. The lathe defined in claim 5, wherein said feeler means is pivoted to said tool support about in axis normal to the direction of said oblique radial movement.

8. The lathe defined in claim 6, wherein said feeler means includes an arm extending laterally therefrom for engagement with said other stop means.

9. The lathe defined in claim 1, including control means responsive to engagement of the feeler means with said second stop means for moving the tool support to an initial position relative to the work.

10. A copying lathe having a revolving work support, a carriage movable in an axial direction relative to the work support, a tool supporting slide movable in a radial direction relative to the carriage, feeler means mounted on said slide for radial displacement relative thereto, means mounted on said slide and responsive to radial displacement of the feeler means relative to the slide for imparting corresponding radial movement to the slide relative to the carriage, an indexable stop support having a plurality of independently adjustable stops supported therein, mounted for bodily axial movement with said carriage and indexable relative thereto for interposing selected ones of said stops into the radial path of displacement of the feeler means for determining the depth of cut of the tool into the work, and a plurality of second stops independently adjustable in an axial direction and interposable in the path of axial movement of the feeler means with said carriage for determining the length of cut of the tool relative to the work.

References Cited by the Examiner
UNITED STATES PATENTS

| | | | |
|---|---|---|---|
| 2,896,490 | 7/1959 | Von Zelewsky | 82—14 |
| 2,913,945 | 11/1959 | Granbery et al. | 82—14 |
| 2,938,418 | 5/1960 | Le Brusque | 82—14 |

WILLIAM W. DYER, JR., *Primary Examiner.*

GERALD A. DOST, *Assistant Examiner.*